United States Patent
Moedinger et al.

(10) Patent No.: US 10,059,303 B2
(45) Date of Patent: Aug. 28, 2018

(54) BELT TENSIONER AND METHOD FOR INSTALLING A BELT TENSIONER

(71) Applicant: TRW AUTOMOTIVE GMBH, Alfdorf (DE)

(72) Inventors: Thomas Moedinger, Alfdorf (DE); Martin Nuding, Waldstetten (DE); Andreas Pregitzer, Ellwangen/Krassbronn (DE); Bernd Gentner, Ellwangen/Pfahlheim (DE)

(73) Assignee: TRW Automotive GmbH (DE)

( * ) Notice: Subject to any disclaimer, the term of this patent is extended or adjusted under 35 U.S.C. 154(b) by 4 days.

(21) Appl. No.: 15/304,875

(22) PCT Filed: Apr. 30, 2015

(86) PCT No.: PCT/EP2015/000897
§ 371 (c)(1),
(2) Date: Oct. 18, 2016

(87) PCT Pub. No.: WO2015/169427
PCT Pub. Date: Nov. 12, 2015

(65) Prior Publication Data
US 2017/0182974 A1   Jun. 29, 2017

(30) Foreign Application Priority Data
May 6, 2014   (DE) .................... 10 2014 006 499

(51) Int. Cl.
*B60R 22/36*   (2006.01)
*B60R 22/46*   (2006.01)

(52) U.S. Cl.
CPC .... *B60R 22/4633* (2013.01); *B60R 2022/468* (2013.01); *B60R 2022/4642* (2013.01)

(58) Field of Classification Search
CPC ..................... B60R 22/4633; B60R 2022/468
(Continued)

(56) References Cited

U.S. PATENT DOCUMENTS 6,318,662 B1   11/2001   Hori et al.
6,454,306 B1 *   9/2002   Cunningham ...... B60R 22/4633
102/202.14

(Continued)

FOREIGN PATENT DOCUMENTS

DE   102010054846   6/2012

*Primary Examiner* — Toan To
(74) *Attorney, Agent, or Firm* — Tarolli, Sundheim, Covell & Tummino LLP

(57) ABSTRACT

In a belt tensioner (10) for a seat belt comprising an elongate pressure reservoir (12), a piston (18) movably supported in the pressure reservoir (12) in the longitudinal direction to which piston pressurized fluid can be applied and which in this way can be moved in a tensioning direction (S), a mechanical thrust means (20) interacting with the piston, the thrust means interacting with a gearwheel (22) and driving the same in the case of restraint, and comprising a stop (24) on which the piston (18) abuts in the tensioning direction in a final position, it is provided that between the piston (18) and the thrust means (20) a spacer (30) in the form of a separate member is provided which is dimensioned such that in the final position of the piston (18) the thrust means (20) is urged past the stop (24) by said spacer. Furthermore there is provided a method of mounting a belt tensioner of this type.

18 Claims, 2 Drawing Sheets

(58) Field of Classification Search
USPC .................................. 280/806; 242/374, 379
See application file for complete search history.

(56) References Cited

U.S. PATENT DOCUMENTS

| | | | |
|---|---|---|---|
| 7,624,940 B2* | 12/2009 | Kitazawa | B60R 22/4633 |
| | | | 242/374 |
| 9,718,439 B2* | 8/2017 | Nagata | B60R 22/4628 |
| 2010/0051734 A1* | 3/2010 | Yamada | B21C 23/205 |
| | | | 242/374 |
| 2012/0032017 A1 | 2/2012 | Yanagawa et al. | |
| 2012/0160947 A1* | 6/2012 | Nagata | B60R 22/4628 |
| | | | 242/374 |
| 2013/0327873 A1 | 12/2013 | Gentner et al. | |
| 2014/0084099 A1* | 3/2014 | Miyoshi | B60R 22/4633 |
| | | | 242/374 |
| 2014/0110518 A1* | 4/2014 | Nakayama | B60R 22/4633 |
| | | | 242/374 |
| 2014/0145021 A1* | 5/2014 | Yanagawa | B60R 22/4633 |
| | | | 242/374 |
| 2014/0175210 A1* | 6/2014 | Betz | B60R 22/1955 |
| | | | 242/382 |
| 2014/0224912 A1* | 8/2014 | Yanagawa | B60R 22/4633 |
| | | | 242/374 |
| 2014/0224915 A1* | 8/2014 | Yanagawa | B60R 22/46 |
| | | | 242/382 |
| 2015/0274122 A1* | 10/2015 | Yanagawa | B60R 22/4633 |
| | | | 242/379.1 |

* cited by examiner

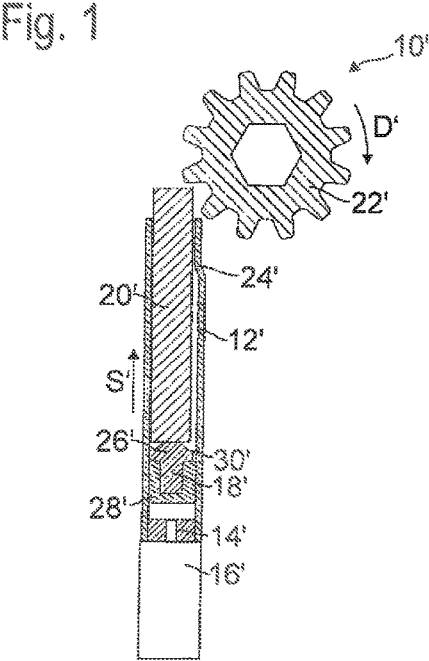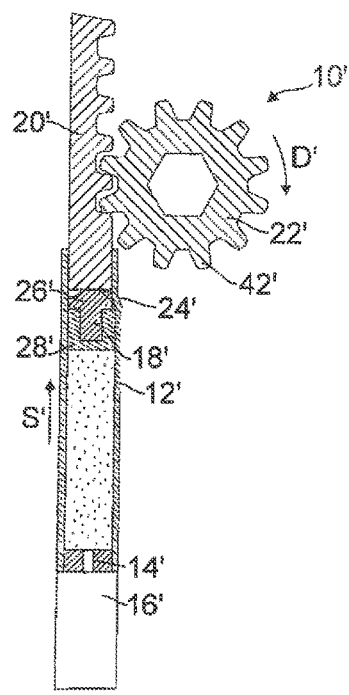

BELT TENSIONER AND METHOD FOR INSTALLING A BELT TENSIONER

RELATED APPLICATION

This application corresponds to PCT/EP2015/000897, filed Apr. 30, 2015, which claims the benefit of German Application No. 10 2014 006 499.9, filed May 6, 2014, the subject matter of which are incorporated herein by reference in their entirety.

BACKGROUND OF THE INVENTION

The invention relates to a belt tensioner, especially a rotary tensioner, for a seat bolt, comprising an elongate, preferably cylindrical pressure reservoir, a piston movably supported in the longitudinal direction in the pressure reservoir to which piston pressurized fluid can be applied and which in this way can be moved in a tensioning direction, a mechanical thrust means interacting with the piston which in the case of restraint interacts with a gearwheel and drives the same and the longitudinal extension of which is larger than the distance of two teeth of the gearwheel, and comprising a stop provided on the inside of the pressure reservoir on which the piston abuts in the tensioning direction in a final position after activating the belt tensioner in which final position the piston seals the pressure reservoir. The invention further relates to a method of mounting a belt tensioner of this type.

From the state of the art belt tensioners comprising an inflator are known including a pressure reservoir in which a piston movably supported in the longitudinal direction is adapted to be moved in the tensioning direction by pressurized fluid. A thrust means interacting with the belt reel such as a toothed rack is displaced by the piston, thus causing the belt reel to be rotated in a tensioning direction. On the inner side of the pressure reservoir a stop is provided on which the piston can abut in the tensioning direction so that it cannot be moved out of the pressure reservoir. The stop and/or the piston are designed so that the pressure reservoir is sealed when the piston abuts on the stop. In this way the pressurized fluid, for example hot gas from an inflator, is prevented from flowing out of the pressure reservoir.

In the case of belt tensioners of this type, however, the thrust means may happen to get caught at the projection so that it cannot be urged completely out of the pipe upon completion of the tensioning operation. In a force-limiting operation following the tensioning operation in which the gearwheel is rotated in the opposite direction, this results in the fact that the thrust means is urged back into the pressure reservoir and past the projection by the gearwheel. This may lead to inadvertent influence on the force limitation.

Furthermore, in the state of the art belt tensioners comprising tensioning means, such as tensioning ropes, instead of thrust means are known.

BACKGROUND OF THE INVENTION

It is the object of the invention to improve the tensioning behavior of such belt tensioner as well as to ensure reliable functioning of the belt tensioner even after quite long storage in the vehicle. It is another object of the invention to provide a simpler method of mounting a belt tensioner of this type.

For achieving the object in a belt tensioner of the type mentioned in the beginning it is provided that between the piston and the thrust means a spacer in the form of a separate member is provided to be dimensioned so that in the final position of the piston the thrust means is urged past the stop and especially out of the pressure reservoir by said spacer.

This spacer moving the thrust means past the stop ensures that, when the final position of the piston is reached, the thrust means cannot get caught at the projection or cannot be decelerated by the same. The thrust means is accelerated and, resp., driven until it has been moved completely past the projection and subsequently can move freely.

In order to safeguard that the thrust means is thrusted completely past the stop, the length of the spacer is preferably equal to or larger than the length of the stop in the longitudinal direction of the pressure reservoir. In addition, the spacer may be dimensioned such that it gets caught at the stop or is jammed at the same so that it cannot exit the pressure reservoir.

Preferably the length of the spacer is dimensioned so that in the final position of the piston the thrust means is completely forced out of the pressure reservoir. When, after activating the belt tensioner, force limitation takes place at the belt retractor, the gearwheel interacting with the thrust means and being coupled to the belt reel is rotated in a direction opposite to the tensioning case. If the thrust means still protruded partly into the pressure reservoir, it would be urged into the pressure reservoir again by the opposite rotation of the gearwheel. The resistance when thrusting the thrust means into the pressure reservoir would cause a change in the characteristic of the force limitation. When the thrust means is completely forced out of the pressure reservoir, however, free movement of the gearwheel, even with the coupled thrust means, is possible as the latter is equally adapted to move freely.

The spacer and the piston may enter in positive engagement so that a better hold and a better force transmission between the same are ensured. Moreover, the spacer is prevented in this way from being freely movable, especially after the tensioning case has been activated and the thrust means has left the pressure reservoir.

Coupling of the spacer and of the piston may be performed, for example, by a projection provided on the spacer and/or on the piston. Said spacer preferably engages in a recess on the piston side or on the spacer side, or vice versa.

Moreover, for achieving the object it is provided for a belt tensioner of the type mentioned in the beginning, especially for a belt tensioner according to the invention, that in a home position of the piston prior to activation of the belt tensioner the stop fixes, and especially clamps, the thrust means within the pressure reservoir. Hence the thrust means is safely fixed in the pressure reservoir by the projection so that it cannot move out of the pressure reservoir slowly by the vibrations occurring in the vehicle.

For example, the stop may be formed by an embossing of the pressure reservoir by which the cross-section of the pressure reservoir is narrowed so that the thrust means is jammed within the pressure reservoir. This type of manufacture of the projection enables the projection to be easily introduced into the pressure reservoir. Moreover, it is possible in this way to initially insert the thrust means into the pressure reservoir and to subsequently fix it by introducing the projection. In this way, the mounting of the belt tensioner, especially of the thrust means, in the pressure reservoir is substantially facilitated.

For achieving the object moreover a method of mounting a belt tensioner is provided comprising the following steps of:

a) inserting the thrust means into the pressure reservoir, and b) subsequently introducing the stop into the pressure reservoir, with the thrust means being fixed by the stop in the pressure reservoir.

Consequently, the projection is not introduced before the thrust means has been inserted so that the thrust means can be inserted into the pressure reservoir without any resistance. In this way the mounting is substantially facilitated, but also the thrust means can be prevented from being damaged during mounting by a projection already provided in the pressure reservoir.

Preferably, the stop is manufactured by embossing.

BRIEF DESCRIPTION OF THE DRAWINGS

Further advantages and features will be resulting from the following description in combination with the enclosed drawings, in which:

FIG. 1 shows a prior art belt tensioner in an initial state,
FIG. 2 shows the belt tensioner of FIG. 1 after a tensioning operation.

DESCRIPTION

Figure 3:
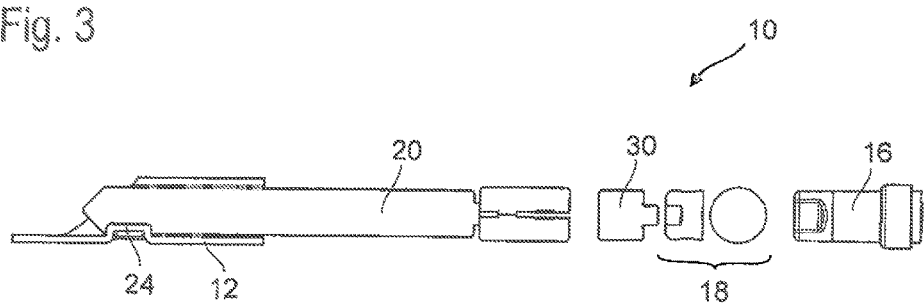
FIG. 3 shows a detailed view of a belt tensioner according to the invention in the initial state.

In FIGS. 1 and 2 a prior art belt tensioner 10' for a vehicle is shown comprising an elongate cylindrical pressure reservoir 12' to which an inflator 16' is connected via a passage 14', in the pressure reservoir 12' a piston 18' movably supported in a tensioning direction S' and a thrust means 20' interacting with a gearwheel 22', in this case a thrust rod arranged in the tensioning direction S' ahead of the piston 18' and abutting on the same, are provided.

The longitudinal extension of the thrust means 20' is longer than the distance of two teeth of the gearwheel 22'. The thrust means 20' is made of relatively soft material so that the teeth of the gearwheel 22' may be pressed into the thrust means 20' when the latter is moved past the gearwheel 22'.

On the front end in the tensioning direction S' of the pressure reservoir 12' a stop 24' is provided for restricting the movement of the piston 18' in the tensioning direction S'. This stop 24' causes the diameter of the pressure reservoir 12' to be reduced so that it is smaller than the diameter of the piston 18'.

The piston 18' in this embodiment has a two-part design and includes a decelerating element 28' as well as a sealing element 28' arranged there behind in the tensioning direction S'. The decelerating element 26' is made of hard material. The sealing element 28' consists of soft material. As is visible in FIG. 1, the diameter of the pressure reservoir 12 is selected and the decelerating element 26 is supported in the pressure reservoir so that the piston 18' can move freely in the pressure reservoir 12'. The sealing element 28' which is made of soft material has a slightly larger diameter so that it seals the lower area of the pressure reservoir 12' regarding FIG. 1 against the upper area.

Pressurized fluid flowing out of the inflator 16' may flow via the passage 14' into the pressure reservoir 12, thus causing the piston 18' to be moved in the tensioning direction S' by the increasing pressure. The piston 18' moving in the tensioning direction S' thrusts the thrust means 20' in the tensioning direction S' out of the pressure reservoir 12'. The thrust means 20' engages in the gearwheel 22' and rotates the same in a direction of rotation D'.

The gearwheel 22' is coupled to a belt reel or a belt buckle not shown here. By rotating the gearwheel 22' in the direction of rotation D' the belt reel is rotated so that webbing is wound onto the belt reel or a cable coupled to the belt buckle is wound up and thus the seat belt is tensioned.

The piston 18' is moved in the tensioning direction S' until it abuts on the stop 24' of the pressure reservoir 12'. In this position the piston 18', especially the sealing element 28', prevents the pressurized fluid, for example hot gas, from escaping from the pressure reservoir 12' into the vehicle interior, for example.

It is a drawback of this belt tensioner 10' that the thrust means 20' gets caught in the final position at the projection 24 or is decelerated by the latter, respectively, and thus is partly retained inside the pressure reservoir 12'. Especially in the final position shown in FIG. 2 after activation of the belt tensioner 10', in a subsequent event of force limitation in which the belt reel and thus the gearwheel 22' coupled to the belt reel is moved against the direction of rotation D' the problem that the thrust means 20' is urged back into the pressure reservoir 12' is arising. In this way higher resistance is brought about upon rotation of the gearwheel 22' against the direction of rotation D', which results in a negative impact on the force limiting characteristic.

In order to overcome the afore-mentioned problems a belt tensioner according to the invention as illustrated in FIG. 3 includes a spacer 30 which is disposed between the piston 18 and the thrust means 20.

The length of said spacer 30 in the longitudinal direction of the pressure reservoir 12 is equal to or larger than the length of the stop 24 in the pressure reservoir 12. As is evident from FIG. 4, in this way the thrust means is ensured to be urged completely past the stop 24 in the case of tensioning.

Figure 4:
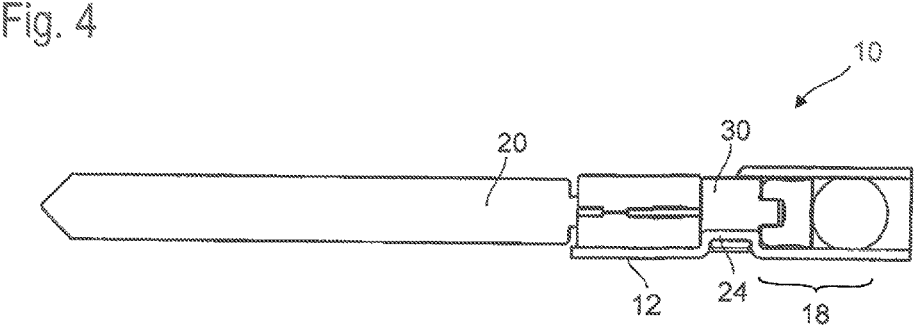
FIG. 4 shows the belt tensioner of FIG. 3 after completion of the tensioning operation.

In particular, the spacer 30 is dimensioned so that in the final position of the piston 18 at the stop 24 shown in FIG. 4 the thrust means is completely forced out of the pressure reservoir. Hence it is ensured that in a subsequent event of force limitation the thrust means 20 is freely movable and/or is no longer engaged in the gearwheel 22 so that the force limitation is not affected by the thrust means 20.

In order to prevent inadvertent movement of the thrust means in the driving operation by vibrations, the projection 24 is formed by an embossing of the pressure reservoir 12 which narrows the cross-section of the pressure reservoir 12 such that the thrust means 20 is jammed within the pressure reservoir 12, as it is evident from FIGS. 3 and 4.

This guarantees that the thrust means 20 is reliably retained in the desired position directly on the piston 18 and, resp., on the spacer 30. The dimension of the projection 24, especially the narrowed cross-section of the pressure reservoir 12 by the projection 24, is selected so that the thrust means 20 is safely held in the initial position, but that in the case of activation the thrust means 20 is possibly slightly influenced or decelerated by the projection 24.

Preferably, the thrust means 20 has been inserted into the pressure reservoir 20 in a first mounting step and only afterwards the stop has been introduced, especially by embossing, to the pressure reservoir in a second mounting step. Thus it is possible to easily insert the thrust means 20 without an increased resistance having to be overcome by the already present projection 24.

In the embodiment shown here the spacer 30 merely abuts on the piston 18. As an alternative, it is also imaginable, however, that these elements are positively connected to each other, for example by a projection provided on the piston and/or on the spacer which engages in a recess on the piston side or on the spacer side (or vice versa). In this way the spacer 30 is ensured to be safely held on the piston 18 after completion of the event of tensioning so that no loose parts are present on the belt tensioner.

The diameter of the spacer 30 may be selected to be smaller than the diameter of the pressure reservoir 12 in the area of the projection 24. Of preference, it is slightly larger, however, so that the spacer 30 is jammed at the projection 24 and held by the same, resp., after the event of tensioning is completed.

The invention claimed is:

1. A belt tensioner (10) for a seat belt, comprising an elongate, cylindrical pressure reservoir (12), a piston movably supported in the longitudinal direction in the pressure reservoir (12) to which piston pressurized fluid is applied and which thus can be moved in a tensioning direction (S), a mechanical thrust means (20) interacting with the piston (18) which thrust means in the case of restraint interacts with a gearwheel (22) and drives the gearwheel (22) and a longitudinal extension of the thrust means (20) is larger than a distance of two teeth of the gearwheel, and comprising a stop (24) provided on the inside of the pressure reservoir (12) on which the piston (18) abuts in the tensioning direction (S) in a final position after activation of the belt tensioner (10) in which position the piston (18) seals the pressure reservoir (12), wherein between the piston (18) and the thrust means (20) a spacer (30) in the form of a separate member is provided which is dimensioned so that in the final position of the piston (18) the thrust means (20) is urged past the stop (24) out of the pressure reservoir, by the spacer.

2. The belt tensioner according to claim 1, wherein the length of the spacer (30) is equal to or larger than the length of the stop (24) in the longitudinal direction of the pressure reservoir (12).

3. The belt tensioner according to claim 1, wherein the length of the spacer (30) is dimensioned so that in the final position of the piston (18) the thrust means (20) is completely forced out of the pressure reservoir (12).

4. The belt tensioner according to claim 1, wherein the spacer (30) and the piston (18) are in positive engagement.

5. The belt tensioner according to claim 1, wherein a projection engaging in a recess on the piston side or on the spacer side or vice versa is provided on the spacer (30) and/or on the piston (18).

6. A belt tensioner (10) for a seat belt, according to claim 1, comprising an elongate, cylindrical pressure reservoir (12), a piston (18) movably supported in the pressure reservoir (12) in the longitudinal direction to which piston pressurized fluid may be applied and which in this way can be moved in a tensioning direction (S), a mechanical thrust means (20) interacting with the piston (18) which thrust means in the case of restraint interacts with a gearwheel (22) and drives the gearwheel (22) and a longitudinal extension of the thrust means (20) is larger than a distance of two teeth of the gearwheel (22), and comprising a stop (24) provided on the inside of the pressure reservoir (12) on which stop the piston (18) abuts in the tensioning direction (S) in a final position in which the piston (18) seals the pressure reservoir (12), wherein in an initial position of the piston (18) prior to activation of the belt tensioner (20) the stop (24) fixes jams, the thrust means (20) within the pressure reservoir (12).

7. The belt tensioner according to claim 6, wherein the stop (24) is formed by an embossing of the pressure reservoir (12) by which the cross-section of the pressure reservoir (12) is narrowed so that the thrust means (20) is jammed within the pressure reservoir (12).

8. A method of mounting a belt tensioner (10) according to claim 6, characterized by the following steps of:
   a) inserting the thrust means (20) into the pressure reservoir (12), and
   b) subsequently introducing the stop (24) to the pressure reservoir (12), wherein the thrust means (20) is fixed in the pressure reservoir (12) by the stop (24).

9. The method according to claim 8, wherein the stop (24) is produced by embossing.

10. A belt tensioner for a seat belt, comprising:
    a pressure reservoir extending in a longitudinal, tensioning direction and including a stop;
    a piston positioned within the pressure reservoir for movement in the tensioning direction;
    a mechanical thrust means movable by the piston within the pressure reservoir for driving a gearwheel coupled to the seat belt, the thrust means extending in the tensioning direction a distance greater than a distance of two teeth of the gearwheel; and
    a spacer separate from the piston and positioned between the piston and the thrust means, the spacer being dimensioned such that, upon activation of the belt tensioner to apply pressurized fluid to the piston, the piston urges the thrust means past the stop and has a final position abutting the stop to seal the pressure reservoir.

11. The belt tensioner according to claim 10, wherein the spacer has a final position, following activation of the belt tensioner, jammed at the stop.

12. The belt tensioner according to claim 10, wherein the final position of the piston is upstream of the stop.

13. The belt tensioner according to claim 10, wherein the spacer includes one of a projection and a recess and the piston includes the other of the projection and the recess for interconnecting the spacer and the piston.

14. The belt tensioner according to claim 10, wherein the spacer has a length in the tensioning direction equal to or greater than a length of the stop in the tensioning direction.

15. The belt tensioner according to claim 10, wherein the stop is U-shaped.

16. The belt tensioner according to claim 10, wherein the spacer is dimensioned so that in the final position of the piston the thrust means is urged out of the pressure reservoir by the spacer.

17. A method of mounting a belt tensioner according to claim 10, comprising the following steps of:
    a) inserting the thrust means into the pressure reservoir; and
    b) subsequently forming the stop on the pressure reservoir such that the stop holds the thrust means in position in the pressure reservoir.

18. The method according to claim 16, wherein the stop is produced by embossing.

* * * * *